(12) United States Patent
Matt

(10) Patent No.: US 6,834,557 B2
(45) Date of Patent: Dec. 28, 2004

(54) MEASURING AND OPERATING CIRCUIT FOR A CORIOLIS-TYPE MASS FLOWMETER

(75) Inventor: Christian Matt, Aesch (CH)

(73) Assignee: Endress + Hauser Flowtec AG, Reinach (CH)

(*) Notice: Subject to any disclaimer, the term of this patent is extended or adjusted under 35 U.S.C. 154(b) by 0 days.

(21) Appl. No.: 10/363,846

(22) PCT Filed: Sep. 5, 2001

(86) PCT No.: PCT/EP01/10200
§ 371 (c)(1),
(2), (4) Date: Jun. 26, 2003

(87) PCT Pub. No.: WO02/23137
PCT Pub. Date: Mar. 21, 2002

(65) Prior Publication Data
US 2004/0025599 A1 Feb. 12, 2004

(30) Foreign Application Priority Data
Sep. 13, 2000 (EP) .......................... 00119892

(51) Int. Cl.⁷ ................................ G01F 1/78
(52) U.S. Cl. ................................ 73/861.357
(58) Field of Search ............. 73/861.356, 861.357, 73/32

(56) References Cited

U.S. PATENT DOCUMENTS 5,648,616 A      7/1997   Keel
6,073,495 A  *  6/2000   Stadler ............... 73/861.356

FOREIGN PATENT DOCUMENTS

EP      EP0702212 A2   3/1996
WO      WO 98/52000    11/1998

* cited by examiner

Primary Examiner—Edward Lefkowitz
Assistant Examiner—Jewel V. Thompson
(74) Attorney, Agent, or Firm—Bacon & Thomas

(57) ABSTRACT

According to the invention, a digital processor (DSP) is provided in a measuring and operating circuit for a Coriolis-type mass flowmeter. From the vibration sensor signals, said digital processor evaluates only the differential signal (D) and the one sensor signal (S1). The in-phase component (I) and the quadrature components (Q) are determined for the differential signal (D), and the amplification of the second sensor signal (S2) is controlled in such a manner that the in-phase component (I) vanishes. The mass flow rate (m) is determined from the quadrature component (Q).

2 Claims, 3 Drawing Sheets

MEASURING AND OPERATING CIRCUIT FOR A CORIOLIS-TYPE MASS FLOWMETER

TECHNICAL FIELD

This invention relates to a measuring and operating circuit for a Coriolis mass flowmeter.

BACKGROUND OF THE INVENTION

Coriolis mass flowmeters are widely used to determine the mass flow rate of a fluid in a section of pipe. The fluid passes through at least one vibrating flow tube. In most Coriolis mass flowmeters, a vibration exciter and two vibration sensors are mounted on the flow tube. The flow tube and the fluid together form a vibratory system which is normally excited at its resonance frequency. The resonance frequency depends, among other things, on the material and dimensions of the flow tube. It also varies with the density of the flowing fluid. In some cases, the flow tube is excited not at the resonance frequency, but at an adjacent frequency.

The two vibration sensors sense the vibratory motion of the flow tube at two locations spaced a given distance apart in the direction of fluid flow, and convert this vibratory motion into sensor signals. Both sensor signals have the same frequency as the vibratory motion of the flow tube, but they are out of phase.

The phase difference is a measure of the mass flow rate. In a measuring subcircuit, the sensor signals are evaluated and converted to a signal proportional to the mass flow rate of the fluid. Aside from the mass flow rate, further properties of the fluid, e.g. its density, can be determined. This is accomplished, for example, by evaluating the frequency of the vibratory motion of the flow tube.

U.S. Pat. No. 4,801,897 describes an excitation subcircuit which is constructed in the manner of an analog phase-locked loop. In that circuit, the excitation frequency adjusts itself automatically to the resonance frequency of the vibratory system even during variations in fluid density.

The prior-art measuring circuits use either analog techniques, as described in EP-A 698 783 or U.S. Pat. No. 4,895,030, for example, or digital techniques, as described in EP-A 702 212 or U.S. Pat. No. 5,429,002, for example.

EP-A 698 783 discloses a measuring circuit comprising an analog control loop which regulates the two sensor signals at the same amplitude.

EP-A 866 319 discloses a further measuring and operating circuit. In this circuit, the two sensor signals are amplified before being processed, with one of the amplifiers having a variable gain.

In a digital processor, the sum and difference of the two sensor signals as well as one of the sensors signals are evaluated.

For the accuracy of the measurement it is essential that after their amplification, the two sensor signals have the same amplitude. The amplitude regulator required for this purpose evaluates the sum and difference of the two sensor signals.

For the actual determination of the mass flow rate, in addition to the difference signal, the signal from one of the two sensors is needed.

Altogether, in this circuit, three analog vibration signals are formed and then processed in an arithmetic unit. For each vibration signal, at least one A/D converter is necessary in the arithmetic unit.

SUMMARY OF THE INVENTION

It is an object of the invention to provide an operating circuit for a Coriolis mass flowmeter in which fewer vibration signals have to be formed and evaluated and which nevertheless has sufficient accuracy and is easy and inexpensive to implement.

This object is attained by a measuring and operating circuit for a Coriolis mass flowmeter comprising a transducer assembly with at least one flow tube on which a first and a second vibration sensor, spaced a given distance apart in the direction of fluid flow, and a vibration exciter are mounted, the measuring and operating circuit comprising: a first amplifier, which is connected to the first vibration sensor; a second amplifier, which is connected to the second vibration sensor; a first A/D converter for generating a vibration signal S1 proportional to the output signal of the first vibration sensor, which is connected to the first amplifier; a difference stage having its two inputs connected to the first amplifier and the second amplifier, respectively; a second A/D converter, following the difference stage, for generating a difference signal D proportional to the difference of the amplified output signals from the first and second vibration sensors; and a digital processor which, of the vibration sensor signals, evaluates only the difference signal D and the sensor signal S1, and which performs the following steps:

a) Determining the amplitude AMS1 of the sensor signal S1
b) Determining the in-phase component I and the quadrature components Q of the difference signal D with respect to the sensor signal S1 as a reference signal
c) Controlling the gain of the second amplifier in such a way that the in-phase component I of the difference signal disappears
d) Calculating the mass flow rate via the remaining quadrature component Q according to the formula $$m \sim Q/(AMS1*f).$$

BRIEF DESCRIPTION OF THE DRAWINGS

The invention will become more apparent from the following description of an embodiment when taken in conjunction with the accompanying drawings, in which.

DESCRIPTION OF THE PREFERRED EMBODIMENT

Figure 1:
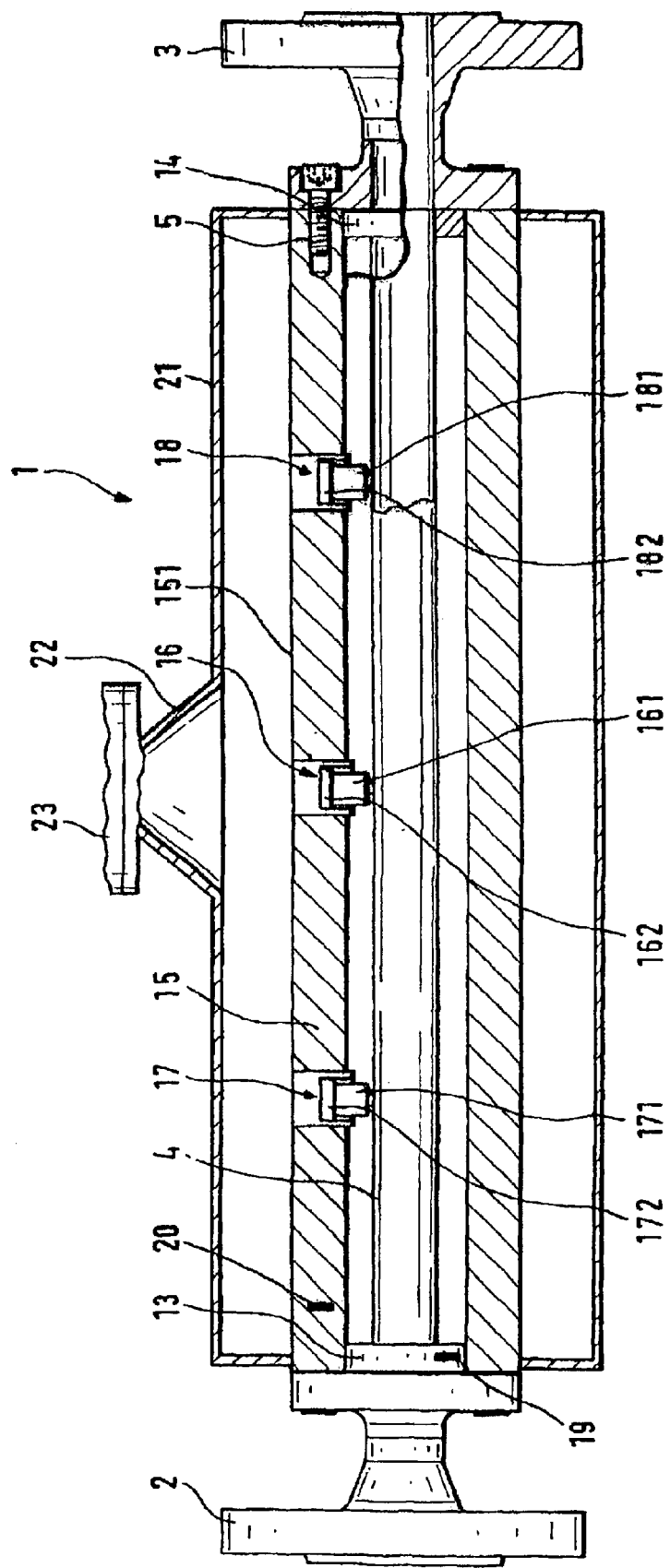
FIG. 1 is a schematic representation of a transducer assembly of a Coriolis mass flowmeter.

FIG. 1 shows schematically a transducer assembly 1 for a Coriolis mass flowmeter. Transducer assembly 1 is installed in a pipe (not shown) carrying a fluid F whose mass flow rate is one of the quantities of interest. The connection with the pipe is made by means of two flanges 2, 3.

Transducer assembly 1 is a single straight flow tube 4, which is fixed to flange 2 at the inlet end via an end plate 13 and at the outlet end via an end plate 14.

The use of the measuring and operating circuit according to the invention is not limited to this specific transducer assembly 1 with a single straight flow tube. The circuit can also be employed in conjunction with various conventional transducer assemblies, e.g. with transducer assemblies having a flow tube with a cantilever mass as described in EP 97 81 0559, for example, with transducer assemblies having a single curved flow tube (EP 96 10 9242), and with transducer assemblies having two parallel straight or curved flow tubes (U.S. Pat. Nos. 4,793,191 and 4,127,028, respectively), The flanges 2, 3 and the end plates are fixed to or in a support tube 15.

To generate the flow-tube vibration, a vibration exciter 16 is mounted on flow tube 4 midway between the two end plates 13, 14. Vibration exciter 16 may be, for instance, an electromagnetic driving mechanism consisting of a permanent magnet 161 and a coil 162.

Coil 162 is fixed to support tube 15, and permanent magnet 161 to flow tube 4.

Via the current flowing in coil 162, the amplitude and frequency of the flexural vibration of flow tube 4, a vibration performed in the plane of the paper, can be controlled.

Also in the plane of the paper, Coriolis forces occur, as a result of which not all the points along flow tube 4 vibrate in phase. The vibratory motion of flow tube 4 is sensed by means of two vibration sensors 17 and 18 which are mounted on support tube 15 symmetrically with respect to vibration exciter 16. Vibration sensors 17 and 18 may be, for instance, electromagnetic transducers similar in construction to the permanent magnet and coil assembly of vibration exciter 16. The two permanent magnets 171, 181 are fixed to flow tube 4, and the two coils 172, 182 to support tube 15. The motion of flow tube 4 causes voltages to be induced in coils 172 and 182 via magnets 171 and 181, respectively. These voltages are picked off as analog sensor signals X17 and X18, respectively.

Figure 2:
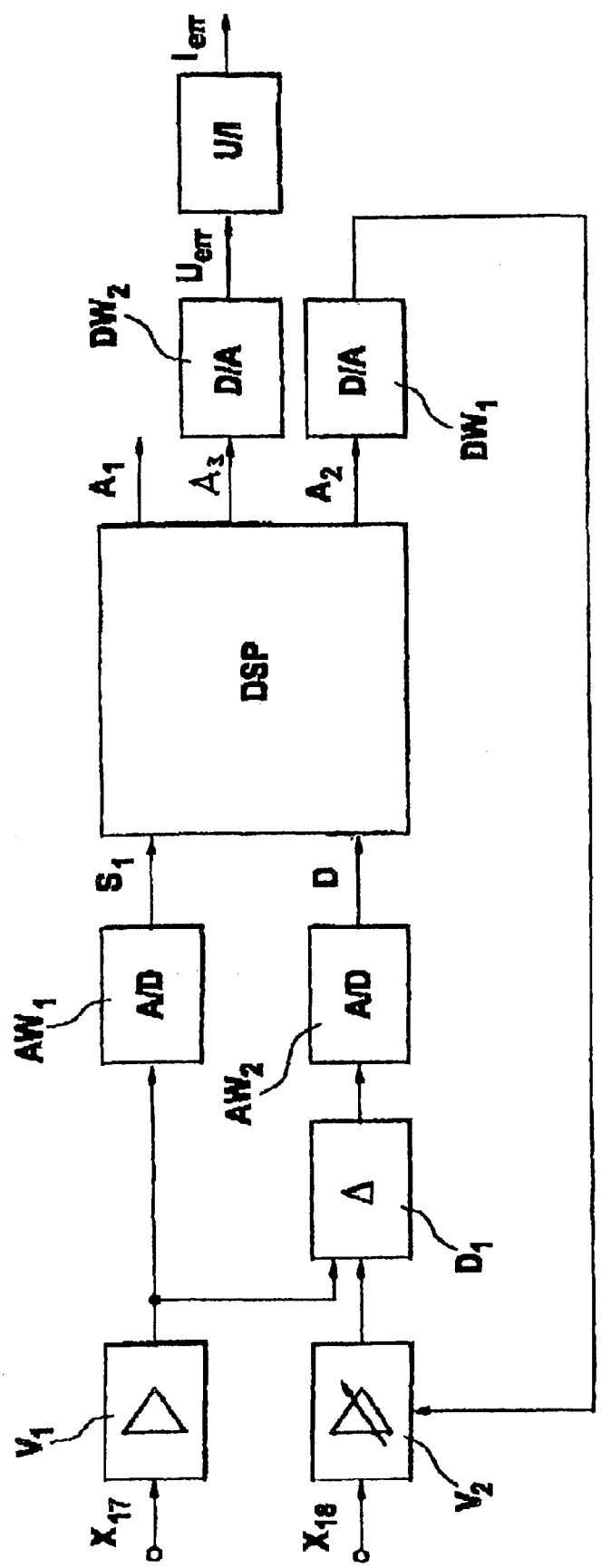
FIG. 2 is a block diagram of a measuring and operating circuit for a Coriolis mass flowmeter.

A Coriolis mass flowmeter, as a rule, consists of a transducer assembly and an associated measuring and operating circuit. FIG. 2 shows a block diagram of a measuring and operating circuit associated with transducer assembly 1. The functions of this circuit include evaluating the sensor signals and controlling the excitation of vibrations.

The two sensor signals X17 and X18 are applied to a first amplifier V1 and a second amplifier V2, respectively. At least the gain of amplifier V2 is variable.

Amplifier V1 is connected to a first A/D converter AW1 and, in parallel therewith, to one input of a difference stage D1.

Amplifier V2 is connected to a further input of difference stage D1. The output of difference stage D1 is coupled to a second A/D converter AW2.

The two outputs of A/D converters AW1 and AW2 provide the sensor signal S1 and the difference signal D, respectively, in digitized form. Both outputs are connected to a digital processor DSP.

The first amplifier V1 and the first A/D converter AW1 form a first vibration signal path SW1. The second amplifier V2, the difference stage D1, and the second A/D converter AW2 form a second vibration signal path SW2.

Accordingly, of the two signals from the vibration sensors, only the digital sensor signal S1 and the digital difference signal D are fed to digital processor DSP over two vibration signal paths SW1 and SW2, respectively.

Digital processor DSP provides at a first output A1 a signal proportional to the mass flow rate m. A second output A2 of digital processor DSP, which provides a gain control signal VS, is connected to an input of a D/A converter DW1, whose output is coupled to amplifier V2. By means of the gain control signal VS, the gain of the second amplifier V2 is adjusted.

A third output A3 provides a signal which controls the excitation current $I_{err}$ for exciting vibrations of the flow tube.

Figure 3:
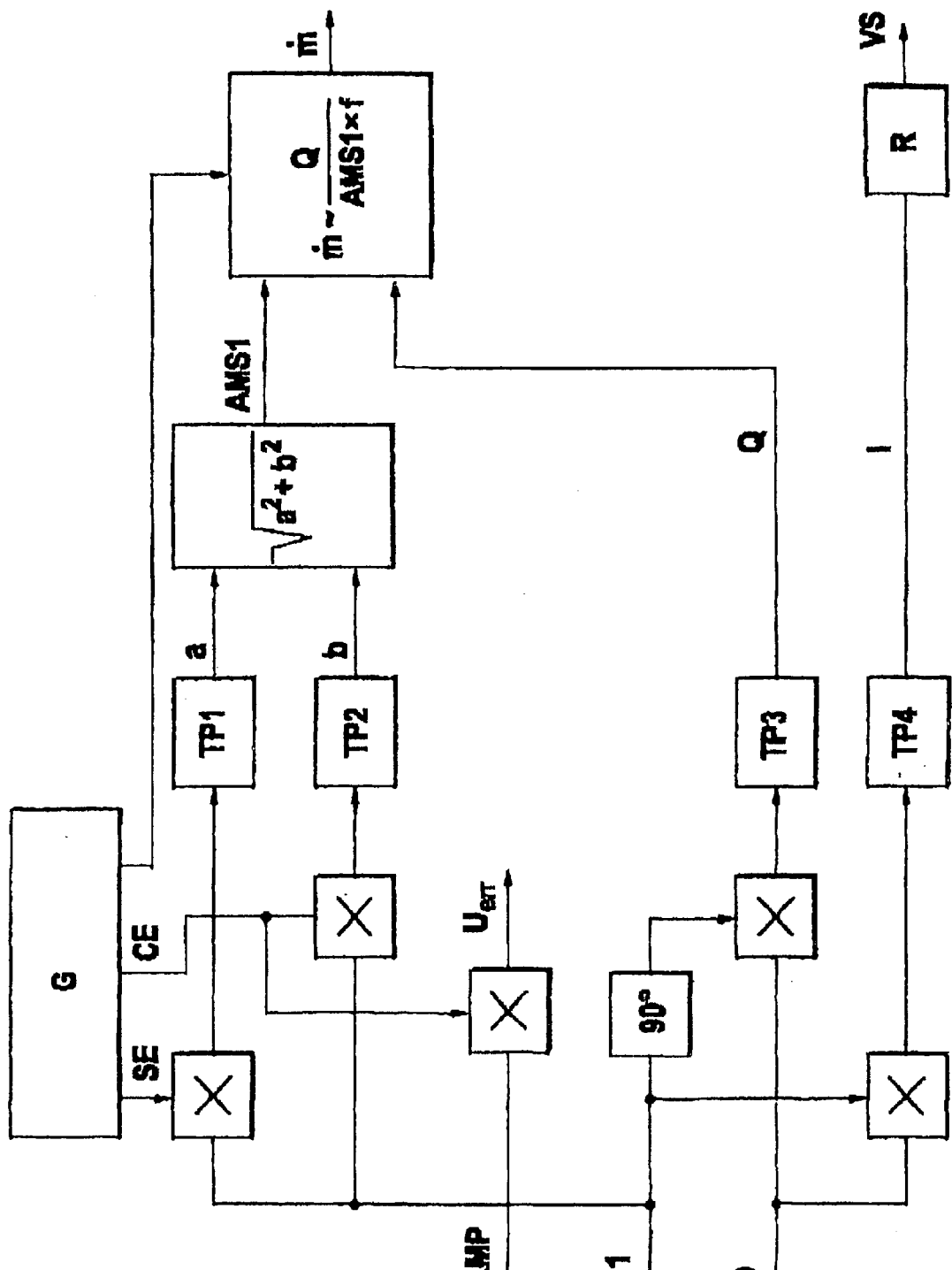
FIG. 3 is a block diagram illustrating individual steps of the method carried out in the measuring circuit of FIG. 2.

FIG. 3 shows schematically the individual steps to determine the mass flow rate m.

Step a): Determining the amplitude AMS1 of sensor signal S1

To determine the amplitude of the digital sensor signal S1, the latter is multiplied by a standard sine-wave signal SE and a standard cosine-wave signal CE, and the signals obtained are filtered with low-pass filters TP1 and TP2, respectively. The low-pass filters provide amplitude values a and b which specify the shares of the sensor signal S1 according to the two standard signals SE and CE. Extracting the root of the sum of squares $a^2+b^2$ gives the amplitude AMS1 of the sensor signal S1, measured in a coordinate system which is spread by the two standard signals SE and CE.

Step b); Determining the in-phase component I and the quadrature components Q of the difference signal D with respect to the sensor signal S1 as a reference signal The difference signal D is multiplied by the sensor signal S1 and then filtered in a low-pass filter TP4 to obtain the in-phase component I of the difference signal D.

In addition, the difference signal D is multiplied by the sensor signal S1 after the latter has been shifted in phase by 90°, and the signal obtained is filtered in a low-pass filter TP3 to obtain the quadrature component Q of the difference signal D.

Step c): Controlling the gain of the second amplifier such that the in-phase component I of the difference signal D disappears The in-phase component I of the difference signal D is fed to a controller R which provides a gain control signal VS with which the gain of amplifier V2 is so controlled that the component I disappears.

When the in-phase component I of the difference signal D disappears, the two signal amplitudes at the outputs of the two amplifiers V1 and V2 are nearly equal. The difference between the signal amplitudes decreases with decreasing phase difference between the sensor signals X17 and X18.

Step d): Calculating the mass flow rate via the remaining quadrature component Q according to the formula $$m \sim Q/(AMS1*f)$$

From the values of the quadrature component Q and the amplitude so determined, the mass flow rate m is determined according to the formula $$m \sim Q/(AMS1*f).$$

The frequency f is provided by a generator G.

In generator G, the two standard signals SE and CE are generated digitally.

The standard cosine-wave signal CE is multiplied by a variable amplitude AMP to obtain the signal $U_{err}$. The signal $U_{err}$ is used to control a driver circuit TR which delivers the excitation current for vibration exciter 16.

To excite the vibratory system exactly at its resonance frequency, digital processor DSP determines the phase difference $d\phi$ between the excitation signal $U_{err}$ and the response function of the system, the sensor signal S1. The frequency f of the standard signals SE and CE is so controlled that the phase difference $d\phi$ becomes zero. In that case, the exciting force is in phase with the vibration velocity of flow tube 4.

What is claimed is:

1. A measuring and operating circuit for a Coriolis mass flowmeter, comprising:
   a transducer assembly including:
      at least one flow tube;
      at least a first and second vibration sensor, spaced a given distance apart in the direction of fluid flow along said at lease one flow tube; and
      a vibration exciter mounted on said at least one flow tube;
   said measuring and operating circuit comprising:
      a first amplifier for amplifying the output signal of said first vibration sensor;
   a second amplifier for amplifying the output signal of said second vibration sensor;
      a first A/D converter for generating a vibration signal proportional to the output signal of said first vibration sensor;
      difference stage means connected to said first amplifier and said second amplifier for generating a difference signal proportional to the difference of the amplified output signals of said first amplifier and said second amplifier;
      a second A/D converter for receiving said difference signal; and
      a digital processor for receiving the output of first A/D converter and said second A/D converter to thereby evaluate said vibration signal generated by said first A/D converter and said difference signal from said second A/D converter.

2. The measuring and operating circuit as defined in claim 1, wherein said digital processor:
   determines the amplitude of the amplified output signal of said first vibration sensor;
   determined an in-phase component and quadrature components of said difference signal with respect to the amplified output signal of said first vibration sensor as a reference signal;
   controls the gain of said second amplifier such that said in-phase component disappears; and
   calculates the mass flow rate via the remaining quadrature component according to the formula $$m \sim Q/(AMS1 * f)$$

where: m represents the mass flow rate;
   Q represents the quadrature components;
   AMS1 represents the amplitude of the amplified output signal of said first vibration sensor; and
   f represents frequency.

* * * * *